(12) United States Patent
Cross et al.

(10) Patent No.: US 11,556,411 B2
(45) Date of Patent: Jan. 17, 2023

(54) QUANTUM CODE FOR REDUCED FREQUENCY COLLISIONS IN QUBIT LATTICES

(71) Applicant: INTERNATIONAL BUSINESS MACHINES CORPORATION, Armonk, NY (US)

(72) Inventors: Andrew W. Cross, Yorktown Heights, NY (US); Christopher Chamberland, Southbury, CT (US); Jay M. Gambetta, Yorktown Heights, NY (US); Jared B. Hertzberg, Yorktown Heights, NY (US); Theodore J. Yoder, White Plains, NY (US); Guanyu Zhu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 16/542,094

(22) Filed: Aug. 15, 2019

(65) Prior Publication Data

US 2020/0341837 A1 Oct. 29, 2020

Related U.S. Application Data

(60) Provisional application No. 62/838,148, filed on Apr. 24, 2019.

(51) Int. Cl.
*G06F 11/10* (2006.01)
*G06N 10/00* (2022.01)
(Continued)

(52) U.S. Cl.
CPC ............. *G06F 11/10* (2013.01); *G06N 10/00* (2019.01); *G06F 11/0751* (2013.01); *H03M 13/1575* (2013.01); *H04L 9/0852* (2013.01)

(58) Field of Classification Search
CPC . G06N 10/00; H03M 13/1575; H04L 9/0852; G06F 11/0751; G06F 11/10
See application file for complete search history.

(56) References Cited

U.S. PATENT DOCUMENTS

| 7,566,896 B2 | 7/2009 | Freedman et al. |
| 7,898,282 B2 | 3/2011 | Harris et al. |
| (Continued) | | |

FOREIGN PATENT DOCUMENTS

| WO | 2017/021714 A1 | 2/2017 |
| WO | 2017/115160 A1 | 7/2017 |
| WO | 2017151200 A1 | 9/2017 |

OTHER PUBLICATIONS

Hutchings et al. "Tunable Superconducting Qubits with Flux-Independent Coherence," arXiv:1702.02253v2 [cond-mat.supr-con] Feb. 21, 2017.
(Continued)

*Primary Examiner* — April Y Blair
*Assistant Examiner* — Sazzad Hossain
(74) *Attorney, Agent, or Firm* — Henry J. Daley; Venable LLP

(57) ABSTRACT

A quantum computer includes a quantum processor that includes a first plurality of qubits arranged in a hexagonal lattice pattern such that each is substantially located at a hexagon apex, and a second plurality of qubits each arranged substantially along a hexagon edge. Each of the first plurality of qubits is coupled to three nearest-neighbor qubits of the second plurality of qubits, and each of the second plurality of qubits is coupled to two nearest-neighbor qubits of the first plurality of qubits. Each of the second plurality of qubits is a control qubit at a control frequency. Each of the first plurality of qubits is a target qubit at one of a first target frequency or a second target frequency. The quantum computer includes an error correction device configured to
(Continued)

operate on the hexagonal lattice pattern of the plurality of qubits so as to detect and correct data errors.

15 Claims, 7 Drawing Sheets

(51) Int. Cl.
   *H03M 13/15* (2006.01)
   *G06F 11/07* (2006.01)
   *H04L 9/08* (2006.01)

(56) References Cited

U.S. PATENT DOCUMENTS

| | | | |
|---|---|---|---|
| 8,190,548 | B2 | 5/2012 | Choi |
| 8,947,080 | B2 | 2/2015 | Lukin et al. |
| 9,286,154 | B2 | 3/2016 | Ashikhmin |
| 9,564,924 | B2 | 2/2017 | Heo et al. |
| 9,748,976 | B2 | 8/2017 | Naaman et al. |
| 9,843,312 | B2 | 12/2017 | Abdo |
| 9,940,586 | B1 | 4/2018 | Epstein et al. |
| 10,229,365 | B2 | 3/2019 | Fuechsle et al. |
| 10,352,992 | B1* | 7/2019 | Zeng ............... G06N 10/00 |
| 2004/0156407 | A1* | 8/2004 | Beausoleil ........ B82Y 10/00 372/43.01 |
| 2014/0264283 | A1 | 9/2014 | Gambetta et al. |
| 2016/0125311 | A1 | 5/2016 | Fuechsle et al. |
| 2016/0344414 | A1 | 11/2016 | Naaman et al. |
| 2019/0044543 | A1* | 2/2019 | Chamberland ....... H03M 13/13 |
| 2019/0296211 | A1 | 9/2019 | Chow et al. |

OTHER PUBLICATIONS

List of IBM Patents or Applications Treated as Related.
Daniel Litinski et al., "Combining Topological Hardware and Topological Software: Color Code Quantum Computing with Topological Superconductor Networks", arxiv.org 1704.01589v2, Sep. 22, 2017, Cornell University Library, 201 Olin Library Cornell University Ithaca, NY 14853, Apr. 5, 2017 (Apr. 5, 2017). XP080761028.
Panos Aliferis et al., " Subsystem fault tolerance with the Bacon-Shor code", arxiv.org quant-ph/0610063v3, Mar. 29, 2007, Cornell University Library, 201 Olin Library Cornell University Ithaca, NY 14853, Oct. 10, 2006 (Oct. 10, 2006), XP080259190.
Christopher Chamberland et al., "Topological and subsystem codes on low-degree graphs with flag qubits", Physical Review X 10, 011022 (2020), arxiv.org, Cornell University Library, 201 Olin Library Cornell University thaca, NY 14853, Jul. 22, 2019 (Jul. 22, 2019), XP081565910.
PCT/EP2020058801 International Serch Report dated Jun. 26, 2020.
PCT/EP2020058801 Writtn Opinion dated Jun. 26, 2020.
International Search Report and Written Opinion received for PCT Application Serial No. PCT/EP2019/054934 dated Jun. 13, 2019, 19 pages.
Otterbach et al., "Unsupervised Machine Learning on a Hybrid Quantum Computer", Dec. 15, 2017, 17 pages.
Tsomokos et al., "Using Superconducting Qubit Circuits to Engineer Exotic Lattice Systems", Sep. 15, 2010, pp. 1-7.
King et al., "Observation of topological phenomena in a programmable lattice of 1,800 qubits", Mar. 6, 2018, 17 pages.
Chow et al., "Implementing a strand of a scalable fault-tolerant quantum computing fabric", Nature Communications, vol. 5, No. 1, Jun. 24, 2014, pp. 1-9.
Kim et al., "Scalable quantum computing model in the circuit-QED lattice with circulator function", Quantum Information Processing, vol. 16, No. 8, Jun. 28, 2017, pp. 1-12.
Fedorov, et al., "P-wave superfluidity of atomic lattice fermions," Physical Review A 95, 043615 (2017) 11 pages.
Lee, et al., "Defect-free atomic array formation using the Hungarian matching algorithm," Physical Review A 95, 053424 (2017), 6 pages.
Zhang et al., "quantized Majorana conductance," arxiv.gov (Year: 2017).
Wooton "Braiding Majoranas in a five qubit experiment," arxiv.gov (Year: 2016).

* cited by examiner

QUANTUM CODE FOR REDUCED FREQUENCY COLLISIONS IN QUBIT LATTICES

BACKGROUND

The currently claimed embodiments of the present invention relate to quantum computers, related methods, and computer-executable code, and more specifically, to quantum computers that have hexagonal lattices of qubits, related methods, and computer-executable code.

Superconducting qubit devices can have frequencies that are determined at the time of fabrication. The arrangement of frequencies influences the quality of the gate operations and therefore the quantum computation. Some types of frequency collisions can cause gates or qubits to be unusable. Chips whose devices have unacceptable frequencies cannot be used, reducing the yield of good chips.

Furthermore, it may be necessary to encode quantum information to further reduce the errors introduced by gate operations and other noise sources. The encoding must be chosen in such a way that the logical (encoded) qubit yield is high. Existing systems and methods do not enable quantum information to be encoded while also improving yield through reduced frequency collisions

SUMMARY

According to an embodiment of the present invention, a quantum computer includes a quantum processor. The quantum processor includes a first plurality of qubits arranged in a hexagonal lattice pattern such that each is substantially located at a hexagon apex of the hexagonal lattice pattern, and a second plurality of qubits each arranged substantially along a hexagon edge of the hexagonal lattice pattern. Each of the first plurality of qubits is coupled to three nearest-neighbor qubits of the second plurality of qubits, and each of the second plurality of qubits is coupled to two nearest-neighbor qubits of the first plurality of qubits. Each of the second plurality of qubits is a control qubit at a control frequency. Each of the first plurality of qubits is a target qubit at one of a first target frequency or a second target frequency such that a control qubit couples each first target frequency target qubit to a second target frequency target qubit. The quantum computer includes an error correction device configured to operate on the hexagonal lattice pattern of the first and second plurality of qubits so as to detect and correct data errors.

According to an embodiment of the present invention, a method of correcting data processing on a quantum processor comprising a plurality of coupled qubits arranged in a modified hexagonal lattice pattern includes encoding a plurality of logical qubits into corresponding pluralities of the plurality of coupled qubits, and performing an X-type gauge measurement of phase flip errors that involve two or four data qubits of the plurality of coupled qubits. The plurality of coupled qubits arranged in a modified hexagonal lattice pattern include a first plurality of qubits arranged in the hexagonal lattice pattern such that each is substantially located at a hexagon apex of the hexagonal lattice pattern, and a second plurality of qubits each arranged substantially along a hexagon edge of the hexagonal lattice pattern. Each of the first plurality of qubits is coupled to three nearest-neighbor qubits of the second plurality of qubits, and each of the second plurality of qubits is couple to two nearest-neighbor qubits of the first plurality of qubits. Each of the second plurality of qubits is a control qubit at a control frequency. Each of the first plurality of qubits is a target qubit at one of a first target frequency or a second target frequency such that a control qubit couples each first target frequency target qubit to a second target frequency target qubit.

According to an embodiment of the present invention, a computer-executable medium which when run by a quantum processor comprising a plurality of coupled qubits arranged in a modified hexagonal lattice pattern, causes the quantum processor to encode a plurality of logical qubits into corresponding pluralities of the plurality of coupled qubits, and perform an X-type gauge measurement of phase flip errors that involve two or four data qubits of the plurality of coupled qubits. The plurality of coupled qubits arranged in a modified hexagonal lattice pattern include a first plurality of qubits arranged in the hexagonal lattice pattern such that each is substantially located at a hexagon apex of the hexagonal lattice pattern, and a second plurality of qubits each arranged substantially along a hexagon edge of the hexagonal lattice pattern. Each of the first plurality of qubits is coupled to three nearest-neighbor qubits of the second plurality of qubits, and each of the second plurality of qubits is coupled to two nearest-neighbor qubits of the first plurality of qubits. Each of the second plurality of qubits is a control qubit at a control frequency. Each of the first plurality of qubits is a target qubit at one of a first target frequency or a second target frequency such that a control qubit couples each first target frequency target qubit to a second target frequency target qubit.

The quantum computer, method, and computer-executable medium achieve the goal of reducing the probability of a frequency collision and therefore increasing chip yield for logical qubits.

DETAILED DESCRIPTION

Figure 1:
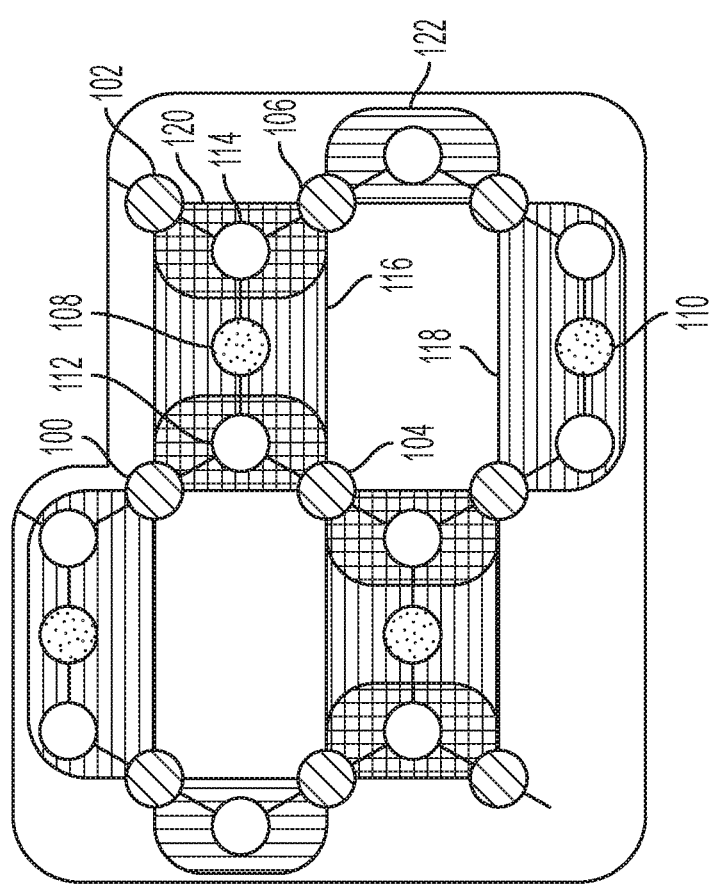
FIG. 1 is a schematic illustration of an example hybrid subsystem code that corrects any error on a single one of a plurality of data qubits (diagonally striped in FIG. 1) and encodes one logical qubit according to an embodiment of the current invention. This example has 9 data qubits and 14 ancilla qubits, for a total of 23 qubits.

FIG. 1 shows one member of the family of quantum codes mapped onto the heavy hexagonal lattice according to an embodiment of the current invention. Circles denote physical qubit devices. Lines indicate connections between devices, i.e., which devices may interact with one another. We refer to this arrangement of qubits on the vertices and edges of a hexagonal lattice as a "heavy hexagon."

Collections of physical qubits encode a logical qubit. The logical qubit is the subspace of Hilbert space protected by the error-correcting code. The physical qubits are assigned one of two types, data or ancilla, based on their function. The data qubits (diagonally striped circles on the edges of the hexagons in FIG. 1, such as data qubits 100, 102, 104, 106) collectively encode the quantum state of a single logical qubit. The ancilla qubits (white and stippled circles in FIG. 1, such as ancilla qubits 108, 110, 112, and 114) are used to measure operators that reveal the presence of errors. We refer to the new code as a hybrid subsystem code. It is a so-called gauge-fixing of a Bacon-Shor code, as it uses X-type stabilizers of the surface code and Z-type gauge operators of the Bacon-Shor code.

X-type gauge measurements (horizontally striped regions in the FIG. 1, for example, regions 116, 118; also see FIG. 3) involve two or four data qubits and yield random but correlated results that are combined along vertical columns to detect phase flip errors. The Z-type gauge operator measurements (vertically striped regions in FIG. 1, for example, regions 120, 122; also see FIG. 4) involve two data qubits and yield random but correlated results that are combined in pairs around the white spaces in FIG. 1 to detect bit flip errors. The lattice and measurement operators (quantum code) can be expanded horizontally and vertically to increase the number of detectable and correctable errors.

The cross-resonance interaction is used to apply two-qubit quantum gates. The input qubits to these gates are called the control qubit and the target qubit. The control qubit is driven at the target qubit's frequency. The control qubits are chosen to be the degree 2 vertices of the graph (i.e. those qubits with exactly two neighbors, for example, the data qubit 104 and the ancilla qubit 108 in FIG. 1) so that only two drive frequencies are necessary for the neighboring target qubits. The frequency of the control qubit must be distinct from both target qubit frequencies, so a total of three frequencies is used. The frequencies are chosen to optimize the two-qubit gates and reduce the collision probability. Having fewer frequencies allows for larger spacing between the frequencies, thereby decreasing the likelihood of frequency collisions.

Figure 2:
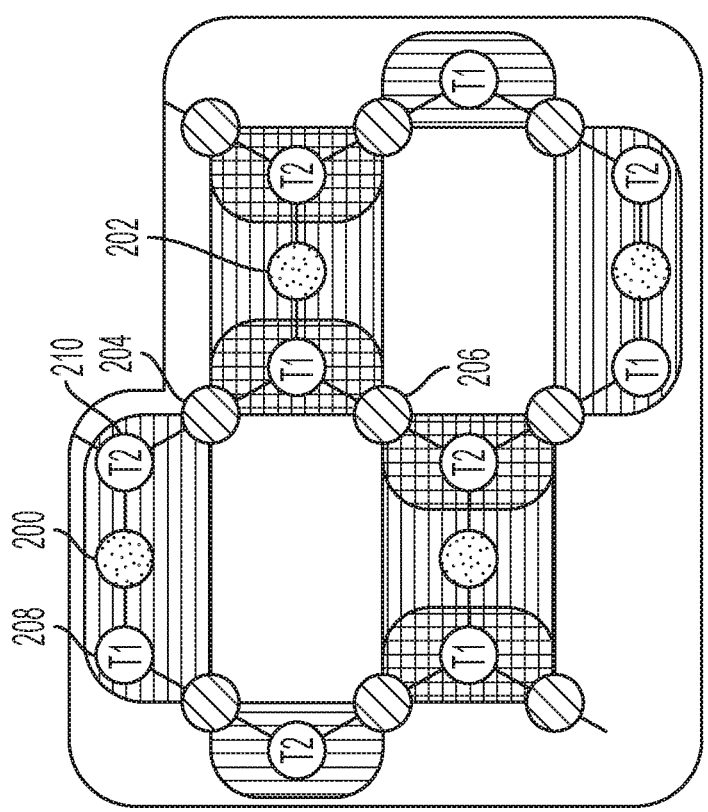
FIG. 2 is a schematic illustration of an example of frequency assignment to the 23 qubits in the example hybrid subsystem code according to an embodiment of the current invention.

FIG. 2 is a schematic illustration of an example of frequency assignment to the 23 qubits in the example hybrid subsystem code according to an embodiment of the current invention. Qubits on the edges of the hexagons, such as ancilla qubits 200, 202 and data qubits 204, 206 in FIG. 2, are assigned as control qubits and given frequency C (C=control). Qubits at the vertices of the hexagons, such as ancilla qubits 208, 210 in FIG. 2, are assigned as target qubits and given alternating frequencies T1 and T2 (T=target). The frequency assignment generalizes to larger codes and lattices in the natural way.

Figure 3:
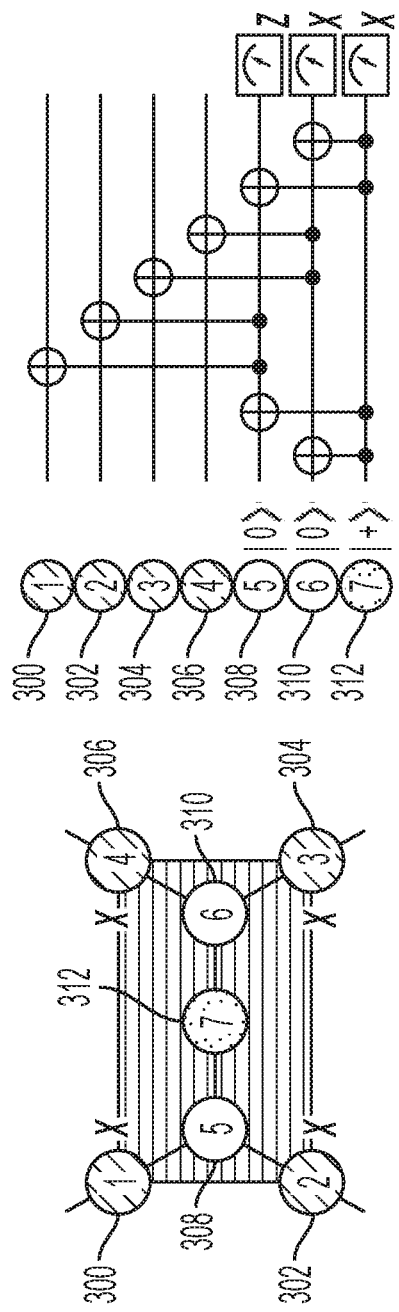
FIG. 3 is a schematic illustration of an example of an X-type measurement circuit with labeled qubit roles according to an embodiment of the current invention.
Figure 4:
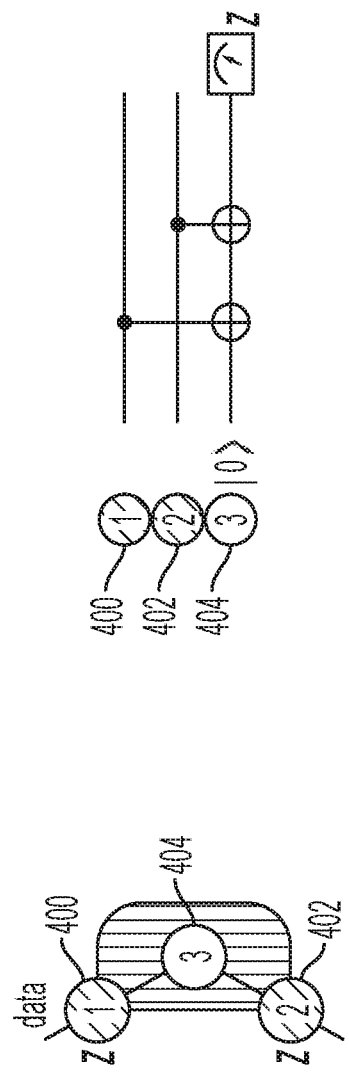
FIG. 4 is a schematic illustration of an example of a Z-type measurement circuit with labeled qubit roles according to an embodiment of the current invention.

Each X-type and Z-type operator can be measured using the respective quantum circuits schematically illustrated in FIG. 3 and FIG. 4. The circuits are fault-tolerant in the usual sense. If a gate fails and introduces errors, either those errors do not spread to other qubits or a "flag measurement" detects how the error has spread so it can be corrected.

A CNOT gate's control and target qubits can be swapped and conjugated by single-qubit Hadamard gates to match the roles implied by the frequency assignment.

The Z-measurement circuit, an example of which is illustrated in FIG. 4, computes and measures the parity of two data qubits 400, 402. The two data qubits 400, 402 are coupled to an ancilla qubit 404, which is measured. One can show that a single fault can affect at most one data qubit in the circuit.

The X-measurement circuit computes and measures the X-type parity of four data qubits 300, 302, 304, 306. Due to the lattice connectivity, faults can lead to X errors that spread to pairs of data qubits. One can show that measurements of the two flag qubits 308, 310 can detect when these events occur so the Z-type parity measurements are correctly interpreted and the errors can be corrected. The circuit measures the two flag qubits 308, 310 and the ancilla qubit 312 that is coupled to the two flag qubits 308, 310.

Figure 5:
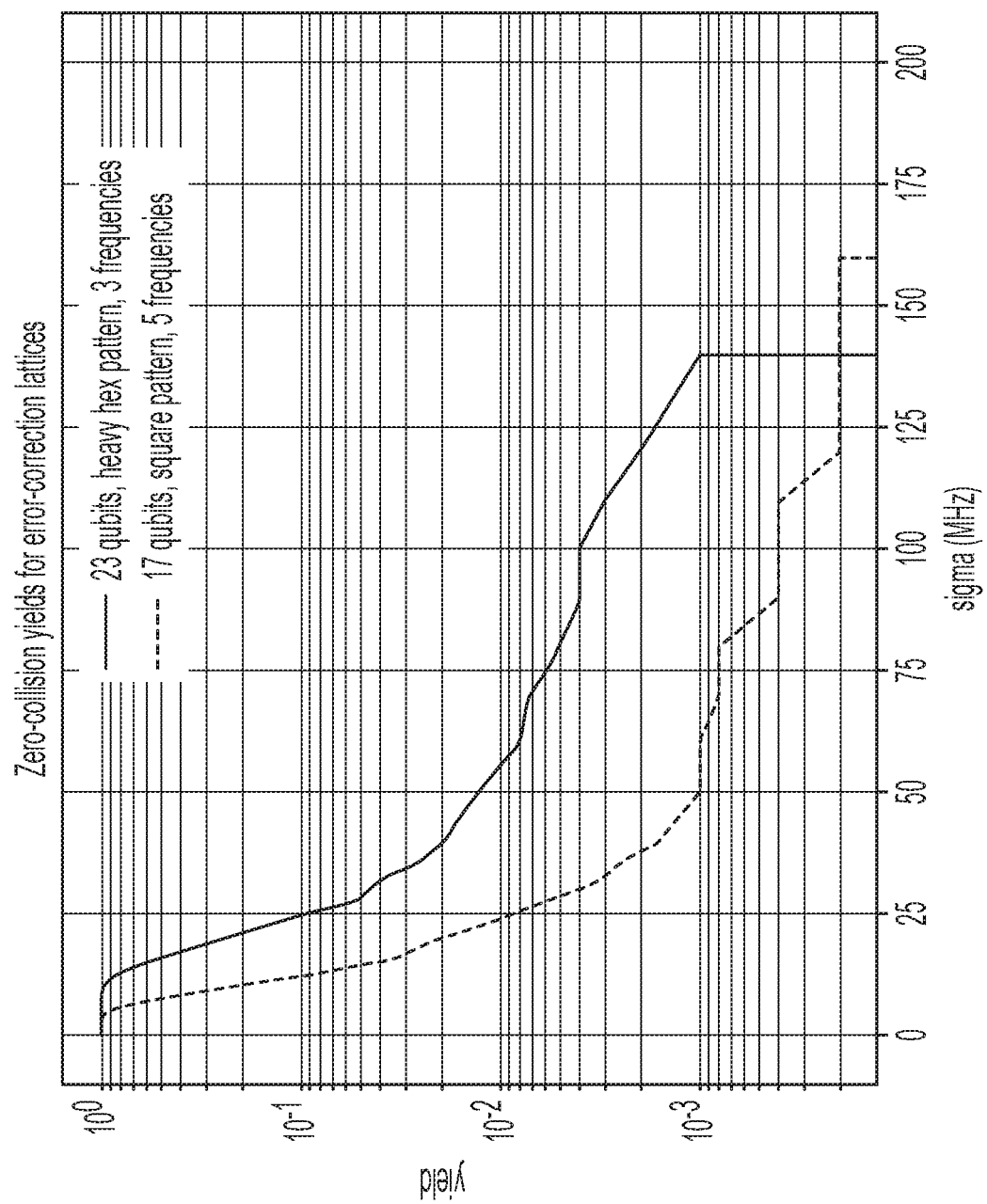
FIG. 5 shows a comparison of zero-collision yield for an error-correction lattice according to an embodiment of the current invention and for a conventional error-correction lattice.

FIG. 5 shows a comparison of zero-collision yield for an error-correction lattice according to an embodiment of the current invention and for a conventional error-correction lattice. We use Monte-Carlo simulations to study the expected yield. Device frequencies are sampled from a normal distribution with the given mean and variance. A set of frequency collision conditions and types is defined, and chip samples are rejected if one or more collisions occur. Based on the simulation results, for 15-20 MHz precision of setting frequencies, hybrid codes on heavy-hexagonal lattices (solid curve) yield zero-collision chips about 10× more often than standard surface codes on square lattices (dashed curve).

Figure 6:
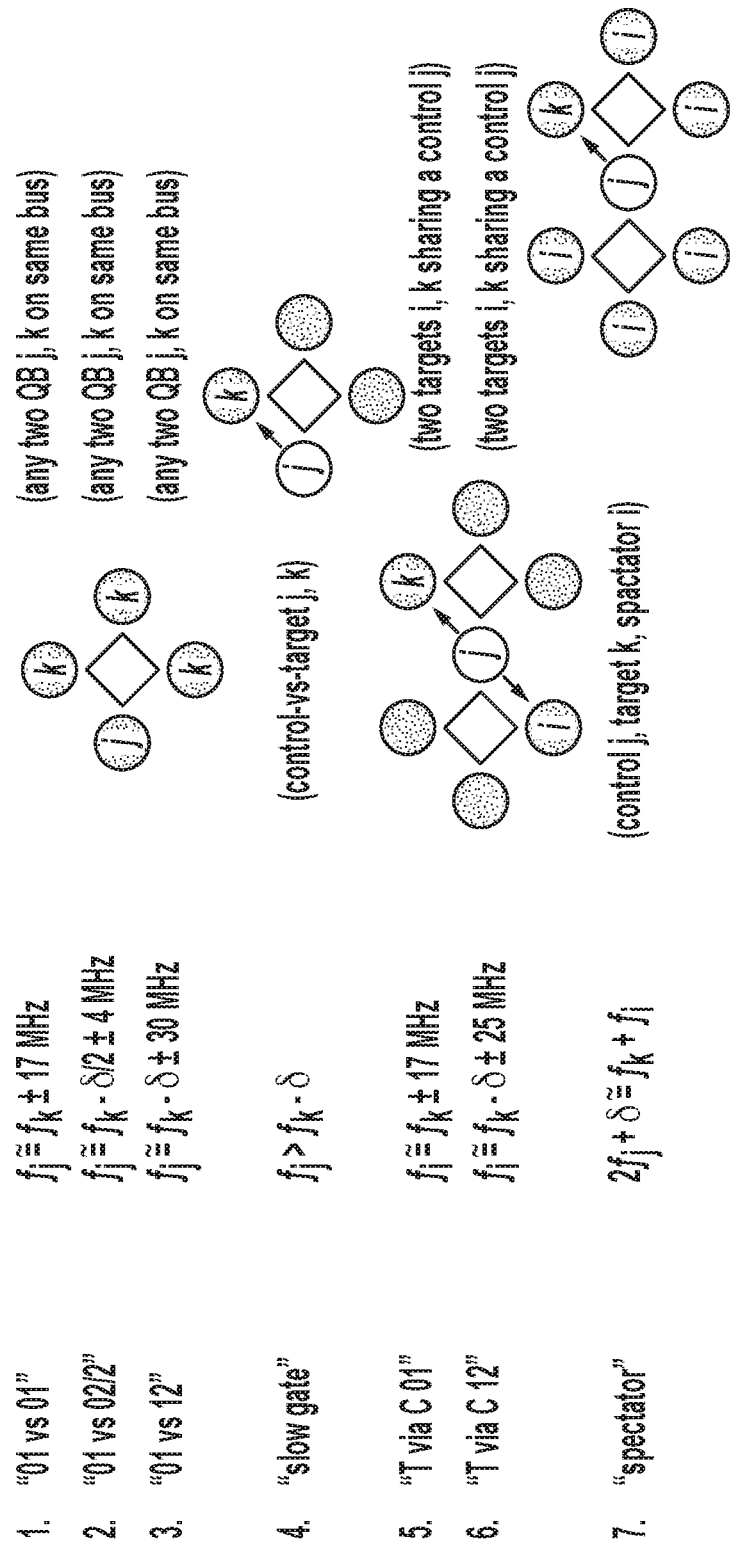
FIG. 6 shows definitions of seven cross-resonance gate collision types.

FIG. 6 shows definitions of seven cross-resonance gate collision types. The lattice geometry disclosed herein helps mitigate these frequency collisions.

Figure 7:
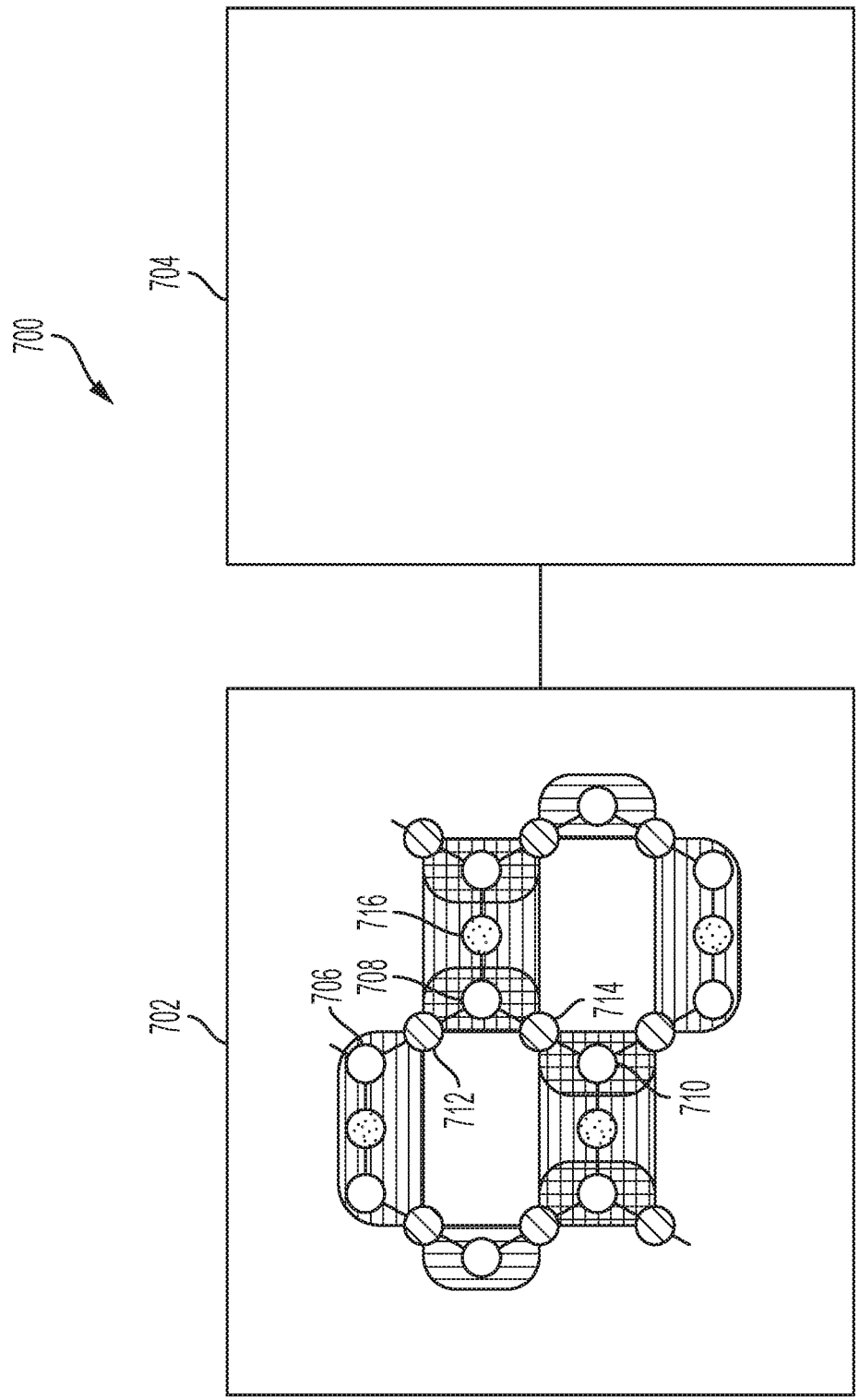
FIG. 7 is a schematic illustration of a quantum computer according to an embodiment of the present invention.

Accordingly, an embodiment of the present invention is directed a quantum computer that includes a quantum processor and an error correction device. FIG. 7 is a schematic illustration of a quantum computer 700 according to an embodiment of the present invention. The quantum computer 700 includes a quantum processor 702 and an error correction device 704. The quantum processor 702 includes a first plurality of qubits arranged in a hexagonal lattice pattern such that each is substantially located at a hexagon apex of the hexagonal lattice pattern. For example, qubits 706, 708, and 710 are substantially located at a hexagon apex of the hexagonal lattice pattern illustrated in FIG. 7. The quantum processor 700 includes a second plurality of qubits each arranged substantially along a hexagon edge of the hexagonal lattice pattern. For example, qubits 712, 714, and 716 are each arranged substantially along a hexagon edge of the hexagonal lattice pattern. Each of the first plurality of qubits is coupled to three nearest-neighbor qubits of the second plurality of qubits. For example, qubit 708 is coupled to a first qubit 712, a second qubit 714, and a third qubit 716. Each of the second plurality of qubits is coupled to two nearest-neighbor qubits of the first plurality of qubits. For example, qubit 712 is coupled to a first qubit 706, and a second qubit 708. Each of the second plurality of qubits is a control qubit at a control frequency, and each of the first plurality of qubits is a target qubit at one of a first target frequency or a second target frequency. A control qubit couples each first target frequency target qubit to a second target frequency target qubit. The error correction device 704 is configured to operate on the hexagonal lattice pattern of the first and second plurality of qubits so as to detect and correct data errors.

According to an embodiment of the present invention, the first plurality of qubits are ancilla qubits and the second plurality of qubits are partially data qubits and partially ancilla qubits. In some embodiments, the error correction device includes X-type gauge circuits that measure phase flip errors that involve two or four data qubits. The X-type gauge circuits include two-qubit gates that have as inputs a target qubit and a control qubit. For each of the two-qubit gates, one of the first plurality of qubits is the target qubit and one of the second plurality of qubits is the control qubit. FIG. 3 is a schematic drawing of an example of an X-type gauge circuit.

In some embodiments, the error correction device includes Z-type gauge circuits that measure bit flip errors that involve two data qubits. The Z-type gauge circuits include two-qubit gates that have as inputs a target qubit and a control qubit. For each of the two-qubit gates, one of the first plurality of qubits is the target qubit and one of the second plurality of qubits is the control qubit. FIG. 4 is a schematic drawings of an example of a Z-type gauge circuit.

In some embodiments, the error correction device encodes a plurality of logical qubits into corresponding pluralities of the first and second pluralities of qubits. For example, the quantum computer 700 may include 23 qubits comprising the first and second pluralities of qubits, wherein the 23 qubits encode a first logical bit. The quantum computer 700 may include additional sets of 23 qubits that encode additional logical bits.

Figure 8:
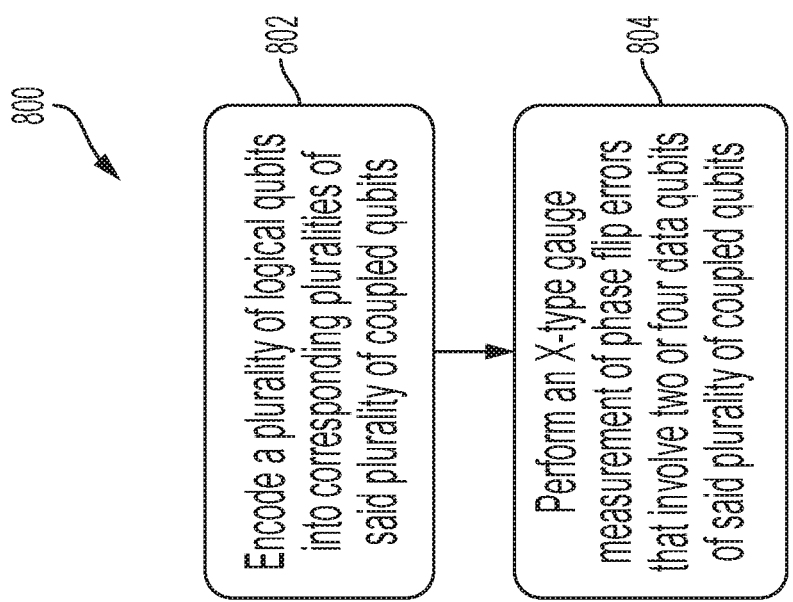
FIG. 8 is a flowchart that illustrates a method of correcting data processing according to an embodiment of the present invention.

FIG. 8 is a flowchart that illustrates a method 800 of correcting data processing according to an embodiment of the present invention. The method 800 of correcting data processing on a quantum processor that includes a plurality of coupled qubits arranged in a modified hexagonal lattice pattern according to an embodiment of the current invention includes encoding a plurality of logical qubits into corresponding pluralities of the plurality of coupled qubits 802. The method includes performing an X-type gauge measurement of phase flip errors that involve two or four data qubits out of the plurality of coupled qubits 804. The plurality of coupled qubits are arranged in a modified hexagonal lattice pattern as noted above.

The method 800 can further include performing a Z-type gauge measurement of bit flip errors that involve two data qubits out of the plurality of coupled qubits.

According to an embodiment of the current invention, a computer-executable medium, when run by a quantum processor comprising a plurality of coupled qubits arranged in a modified hexagonal lattice pattern, causes the quantum processor to encode a plurality of logical qubits into corresponding pluralities of the plurality of coupled qubits, and perform an X-type gauge measurement of phase flip errors that involve two or four data qubits out of the plurality of coupled qubits. The plurality of coupled qubits are arranged in a modified hexagonal lattice pattern as noted above.

The computer-executable medium can further cause the quantum processor to perform a Z-type gauge measurement of bit flip errors that involves two data qubits out of the plurality of coupled qubits.

Some embodiments of the current invention are directed to an arrangement of coupled devices on a modified hexagonal lattice. Every device on the lattice is coupled to at most three neighbors. The modified or "heavy" lattice refers to the additional devices on edges as well as vertices.

Some embodiments of the current invention are directed to a family of quantum codes tailored to heavy octagonal lattice. Quantum codes encode logical qubits into collections of noisy physical qubits such that errors can be detected and corrected. This family of subsystem quantum codes uses Z-type stabilizers of the surface code and X-type stabilizers of the Bacon-Shor code. It is a gauge-fixing of the Bacon-Shor code that adapts to the lattice.

Some embodiments of the current invention are directed to an assignment of frequencies to physical qubits. The assignment allows two-qubit gates to be applied in such a way that only three frequencies are necessary, increasing the total spacing between frequencies and decreasing frequency collisions.

Some embodiments of the current invention are directed to method of error syndrome measurement tailored to the hexagonal lattice. The syndrome is computed from the outcomes the X-type gauge operator and Z-type gauge operator measurements. The method makes use of the available interactions on the lattice. The method is fault-tolerant and uses so-called flag qubits to achieve this.

Some embodiments can reduce the probability of a frequency collision and therefore increase chip yield for logical qubits. Because the plurality of qubits have one of three frequencies, the spacing between each frequency can be larger, reducing the likelihood of frequency collisions, and therefore increasing the qubit chip yield.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A quantum computer, comprising:
a quantum processor, comprising:
a first plurality of qubits arranged in a hexagonal lattice pattern such that each is substantially located at a hexagon apex of said hexagonal lattice pattern,
a second plurality of qubits each arranged substantially along a hexagon edge of said hexagonal lattice pattern between and coupled to corresponding two of said first plurality of qubits,
wherein each of said second plurality of qubits is a control qubit at a control frequency,
wherein each of said first plurality of qubits is a target qubit at one of a first target frequency or a second target frequency arranged such that each hexagon within said hexagon lattice has an alternating pattern of said first and second target qubit frequencies going from apex to apex around edges of said hexagon; and
an error correction device configured to operate on said hexagonal lattice pattern of said first and second plurality of qubits so as to detect and correct data errors.

2. The quantum computer according to claim 1, wherein said first plurality of qubits are ancilla qubits and said second plurality of qubits are partially data qubits and partially ancilla qubits.

3. The quantum computer according to claim 2, wherein said error correction device comprises X-type gauge circuits that measure phase flip errors that involve two or four data qubits.

4. The quantum computer according to claim 3, wherein said X-type gauge circuits include two-qubit gates that have as inputs a target qubit and a control qubit,
wherein, for each of said two-qubit gates, one of said first plurality of qubits is said target qubit and one of said second plurality of qubits is said control qubit.

5. The quantum computer according to claim 3, wherein said error correction device comprises Z-type gauge circuits that measure bit flip errors that involve two data qubits.

6. The quantum computer according to claim 3, wherein said error correction device encodes a plurality of logical qubits into corresponding pluralities of said first and second pluralities of qubits.

7. The quantum computer according to claim 2, wherein said error correction device comprises Z-type gauge circuits that measure bit flip errors that involve two data qubits.

8. The quantum computer according to claim 7, wherein said Z-type gauge circuits include two-qubit gates that have as inputs a target qubit and a control qubit,
wherein, for each of said two-qubit gates, one of said first plurality of qubits is said target qubit and one of said second plurality of qubits is said control qubit.

9. A method of correcting data processing on a quantum processor comprising a plurality of coupled qubits arranged in a modified hexagonal lattice pattern, comprising:
encoding a plurality of logical qubits into corresponding pluralities of said plurality of coupled qubits; and
performing an X-type gauge measurement of phase flip errors that involve two or four data qubits of said plurality of coupled qubits,
wherein said plurality of coupled qubits arranged in a modified hexagonal lattice pattern comprise:
a first plurality of qubits arranged in said hexagonal lattice pattern such that each is substantially located at a hexagon apex of said hexagonal lattice pattern,
a second plurality of qubits each arranged substantially along a hexagon edge of said hexagonal lattice pattern between and coupled to corresponding two of said first plurality of qubits,
wherein each of said second plurality of qubits is a control qubit at a control frequency, and
wherein each of said first plurality of qubits is a target qubit at one of a first target frequency or a second target frequency arranged such that each hexagon within said hexagon lattice has an alternating pattern of said first and second target qubit frequencies going from apex to apex around edges of said hexagon.

10. The method according to claim 9, further comprising performing a Z-type gauge measurement of bit flip errors that involve two data qubits of said plurality of coupled qubits.

11. The method according to claim 10, wherein performing a Z-type gauge measurement comprises using Z-type gauge circuits that include two-qubit gates that have as inputs a target qubit and a control qubit,
wherein, for each of said two-qubit gates, one of said first plurality of qubits is said target qubit and one of said second plurality of qubits is said control qubit.

12. The method according to claim 9, wherein said first plurality of qubits are ancilla qubits and said second plurality of qubits are partially data qubits and partially ancilla qubits.

13. The method according to claim 9, wherein performing said X-type gauge measurement comprises using X-type gauge circuits that include two-qubit gates that have as inputs a target qubit and a control qubit,
wherein, for each of said two-qubit gates, one of said first plurality of qubits is said target qubit and one of said second plurality of qubits is said control qubit.

14. A non-transitory computer-executable medium which when run by a quantum processor comprising a plurality of coupled qubits arranged in a modified hexagonal lattice pattern, causes said quantum processor to:
encode a plurality of logical qubits into corresponding pluralities of said plurality of coupled qubits; and
perform an X-type gauge measurement of phase flip errors that involve two or four data qubits of said plurality of coupled qubits,
wherein said plurality of coupled qubits arranged in a modified hexagonal lattice pattern comprise:
a first plurality of qubits arranged in said hexagonal lattice pattern such that each is substantially located at a hexagon apex of said hexagonal lattice pattern,
a second plurality of qubits each arranged substantially along a hexagon edge of said hexagonal lattice pattern between and coupled to corresponding two of said first plurality of qubits,
wherein each of said second plurality of qubits is a control qubit at a control frequency, and
wherein each of said first plurality of cubits is a target qubit at one of a first target frequency or a second target frequency arranged such that each hexagon within said hexagon lattice has an alternating pattern of said first and second target qubit frequencies going from apex to apex around edges of said hexagon.

15. The computer-executable medium of claim 4, wherein said computer-executable medium when run by said quantum processor further causes said quantum processor to perform a Z-type gauge measurement of bit flip errors that involve two data qubits of said plurality of coupled qubits.

* * * * *